US008538199B2

(12) United States Patent
Ernst et al.

(10) Patent No.: US 8,538,199 B2
(45) Date of Patent: Sep. 17, 2013

(54) DIGITAL IMAGE SCALING WITH NON INTEGER SCALING FACTORS

(75) Inventors: Larry M. Ernst, Longmont, CO (US); Nenad Rijavec, Longmont, CO (US); Natalie Dawn Ross, Longmont, CO (US); Mikel J. Stanich, Longmont, CO (US); John T. Varga, Longmont, CO (US)

(73) Assignee: Ricoh Productions Print Solutions LLC, Boulder, CO (US)

(*) Notice: Subject to any disclaimer, the term of this patent is extended or adjusted under 35 U.S.C. 154(b) by 738 days.

(21) Appl. No.: 12/749,007

(22) Filed: Mar. 29, 2010

(65) Prior Publication Data

US 2011/0235944 A1 Sep. 29, 2011

(51) Int. Cl.
*G06K 9/00* (2006.01)
(52) U.S. Cl.
USPC ............................. 382/298; 382/299; 382/300
(58) Field of Classification Search
USPC .................................................. 382/298–300
See application file for complete search history.

(56) References Cited

U.S. PATENT DOCUMENTS

| 5,920,659 A | 7/1999 | Iverson et al. |
| 6,741,751 B1 | 5/2004 | Klassen |
| 2003/0185463 A1 | 10/2003 | Wredenhagen et al. |
| 2007/0092162 A1 | 4/2007 | Keithly et al. |
| 2007/0116383 A1* | 5/2007 | De Haan ........................ 382/299 |
| 2010/0097491 A1* | 4/2010 | Farina et al. ............... 348/223.1 |
| 2011/0310434 A1* | 12/2011 | Suzuki ........................ 358/1.15 |

OTHER PUBLICATIONS

Vrhel M, "Color Image Resolution Conversion," IEEE Transactions on Image Processing, Mar. 2005.
Kim et al., "Winscale: An Image-Scaling Algorithm Using an Area Pixel Model," IEEE Transactions on Circuits and Systems for Video Technology, Publication Date: Jun. 2003, vol. 13, Issue: 6, pp. 549-553, ISSN: 1051-8215.

* cited by examiner

*Primary Examiner* — Wesley Tucker
(74) *Attorney, Agent, or Firm* — Duft Bornsen & Fettig, LLP

(57) ABSTRACT

Non integer scaling of images to reduce artifacts is presented herein. One embodiment includes determining a scaling resolution based on a pixel resolution of the image and a pixel resolution of an output device (i.e., factors of the scaling resolution). The image is converted to the scaling resolution to change (e.g., increase) the pixels of the image by the first factor. A grid is generated to scale the converted image. The grid has a number of sections defined according to the second factor times the pixel resolution of an output device. The converted image is sectioned according to the grid. Each section of the grid includes an integer number of pixels of the converted image. The color values of the pixels of the converted image are averaged within each section of the grid to compute a single color value for each section of the grid and scale the image.

13 Claims, 8 Drawing Sheets

$J(1,1) = I(1,1)$
$J(1,2) = [I(1,1) + I(1,2)]/2$
$J(1,3) = I(1,2)$ $J(2,1) = [I(1,1) + I(2,1)]/2$
$J(2,2) = [I(1,1) + I(1,2) + I(2,1) + I(2,2)]/4$
$J(2,3) = [I(1,2) + I(2,2)]/2$ $J(3,1) = I(2,1)$
$J(3,2) = [I(2,1) + I(2,2)]/2$
$J(3,3) = I(2,2)$

DIGITAL IMAGE SCALING WITH NON INTEGER SCALING FACTORS

BACKGROUND

1. Field of the Invention

The invention relates to scaling digital images and more specifically to scaling images using non integer factors to reduce artifacts and errors in resultant output images.

2. Statement of the Problem

Digitization of images has provided many benefits in terms of portability, storage, and reproduction. Often, digitized images can be processed to alter the image, (e.g., change the image size). For example, once an image is digitized, it is converted into image data represented by a two dimensional array of pixels, with each pixel having some color or grayscale value. This two dimensional array of pixels can be reduced in size by removing a certain number of pixels from the array in a manner that still provides an adequate representation of the original image. Similarly, pixels can be added to the array to increase the size of the image.

One basic approach to scaling includes the "nearest neighbor" method, which uses sample values that are nearest to a pixel being analyzed. This is generally known as a zero-order or proximal interpolation and generally produces relatively good high frequency response, but degrades image quality due to aliasing. To illustrate, a 240 dots per inch (DPI) image as it would be printed on a 360 DPI printer is now discussed. In this example, the scaling factor is a non integer 1.5 (i.e., 360 dpi/240 dpi=1.5). The scaling ratio is converted to the nearest ratio which is all integer. For this case, the ratio is three to two, meaning that for every two PELs in the input space there are three PELs created in the output space. Using a nearest neighbor pixel replication algorithm, the algorithm outputs one copy of the first pixel, two copies of the second, and so on, in a 1-2-1-2-1-2 . . . pattern. This pattern satisfies the two PELs becoming three in the output space requirement. The same holds true for scanlines in the image in that the first scanline appears once, the second is repeated twice, etc. The problem with this scaling approach is that it can cause undesirable artifacts in the output image, especially if the scaling factor is not an integer. Consider the following image pattern with the same proposed scaling of 1.5, where a 1 in the pattern indicates a black pixel and a 0 indicates a white pixel.

111

000

000.

Suppose, with this scaling, the image is to be replicated 3 times down a page. The output of this 1D scaling would then appear as follows:

| DATA | Number of repeats |
|---|---|
| 111 | 1 |
| 000 | 2 |
| 000 | |
| 000 | 1 |
| 111 | 2 |
| 111 | |
| 000 | 1 |
| 000 | 2 |
| 000 | |
| 111 | 1 |
| 000 | 2 |
| 000 | |
| 000 | 1 |

In this diagram, the left side shows the scaled and replicated pattern. The horizontal lines provide a visual aid to the reader to distinguish the copies of the replicated pattern. The right column shows how many copies of the input line are output by the scaling algorithm. Notice how the first copy of the pattern has a black line that is one pixel wide, but the second copy has a black line that is two pixels wide. These inconsistencies are easily recognized when viewed (e.g., on a printed medium), because a single pixel in the input becomes a varying larger number of pixels in the output, generally referred to as an artifact. If the scaling factor is an integer value, no artifact occurs because each pixel is scaled the same.

One method used to overcome these artifacts is a bilinear approach which is regarded as a first-order scaling method. In the bilinear approach, the output pixel value changes linearly according to sampling position. Other more complex methods include the bicubic approach, the use of polynomials, adaptive algorithms, or correlations, but these methods require significant processing capabilities due to their complexities. Additionally, certain images are composed of transparent areas that cause problems in scaling. For example, the image of the font character "O" printed in black on a red background does not overwrite the center of the image or the corners with white data because these pixels are transparent. If the font character was created at a fixed resolution and must be scaled, an efficient scaling is needed that preserves the transparent regions without causing a "halo" effect of white or gray pixels adjacent to the black pixels of the scaled character image.

SUMMARY

Embodiments herein provide for the scaling of image data and in particular to the scaling of image data in non integer factors. Previously, this type of scaling would generally result in artifacts in the output image. In one embodiment, a scaling algorithm that employs "fractional pixel replication" (FPR) is used to scale images with virtually any scaling factor, including non integer scaling factors. The scaling algorithm uses a weighted average of several input pixel values as opposed to generating each output pixel from a single input pixel. Further, the scaling algorithm includes transparent areas in calculating the weighted average. To simplify the discussion of the FPR scaling algorithm, the embodiments herein are directed to grayscale images as the representation of such images is easily performed with fewer color values (e.g., 0-255 levels of gray). However, the invention is not intended to be limited to simply scaling grayscale images as the FPR scaling algorithm may be used to scale color images as well.

An FPR output pixel may take any value in the 0-255 range, where 0=totally white and 255=totally toned (saturated color). Where image regions have opaque pixels that are proximate to transparent regions, the transparent regions may be represented by grayscale values within the grayscale range (e.g., 0-255). To smooth the transition to background colors of the transparent regions, the pixels are made translucent instead of gray by way of a translucency mask. The translucency mask indicates where a blending calculation is to be applied in an image and what weight is to be given to the background at each location. Additionally, the translucency mask allows subsets of a rasterization to be cached and recombined such that results are consistent.

One method for scaling an input image includes identifying a pixel resolution of the input image, identifying a pixel resolution of an output device, and determining a scaling resolution based on the pixel resolution of the input image and the pixel resolution of the output device. The pixel resolution of the input image is a first factor of the scaling resolution, the pixel resolution of the output device is a second factor of the scaling resolution, and the first and second factors are different. The scaling resolution may be a resolution that is common to the input resolution in the output resolution (i.e., evenly divided by each); however, such is not a requirement. The input image may include virtually any pixel resolution format, including anamorphic. The method also includes converting the input image to the scaling resolution to change a number of pixels of the input image by the first factor of the scaling resolution and generating a grid to scale the converted image. The grid has a number of sections defined according to the second factor times the pixel resolution of an output device. The method also includes sectioning the converted input image according to the grid. Each section of the grid includes an integer number of pixels of the converted input image. The method also includes averaging color values of the pixels of the converted input image within each section of the grid to compute a single color value for each section of the grid and scale the input image.

The method may also include generating a translucency mask and applying the translucency mask to the scaled image to smoothly transition foreground color values from background color values. The method may also include storing at least a portion of the translucency mask for application to in a subsequently received background image to optimize processing of the subsequently received background image with the saved scaled foreground image. The method may also include storing at least a portion of the scaled image to optimize processing of a subsequently received background image. The method may be operable with a variety of devices, such as digital cameras, printers, computer processors, and the like.

The color values of the pixels of the input image may be grayscale color values or other color values and formatted in a variety of ways, such as anamorphic. The method may also include generating a translucency mask and applying the translucency mask to the scaled image to smoothly transition color values. When looking at discrete scale ratios, this generally means that certain repeating patterns can allow the calculated transparency values to be cached for improved performance. However, irrational scale ratios where caching is not used are also effective.

Other exemplary embodiments may be described below.

DESCRIPTION OF THE DRAWINGS

Some embodiments of the present invention are now described, by way of example only and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below, but by the claims and their equivalents.

Figure 1:
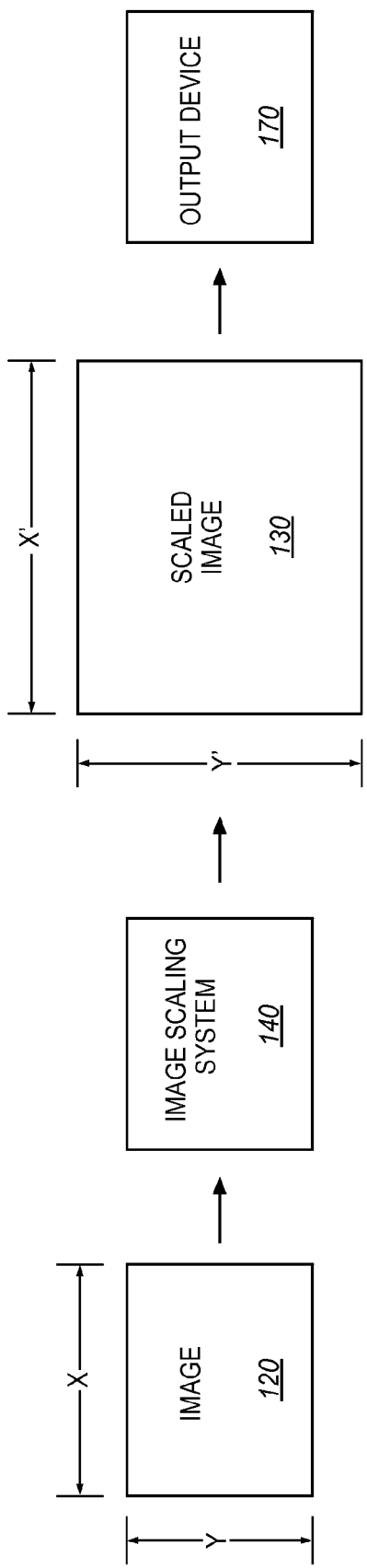
FIG. 1 illustrates an image scaling system in an exemplary embodiment.

FIG. 1 illustrates an image scaling system 140 in an exemplary embodiment. The image scaling system 140 may be any system, device, software, circuitry and/or other suitable component that is operable to scale an image 120 of X*Y resolution to X'*Y' resolution using non integer scaling factors. Once the image 120 is scaled to the X'*Y' resolution, the image scaling system 140 transfers the scaled image 130 to an output device 170 for presentation of the scaled image 130. Examples of the output device 170 include computer monitors, digital cameras, printers, and the like. The image scaling system 140 may be configured as part of the output device 170 or external thereto.

Figure 2:
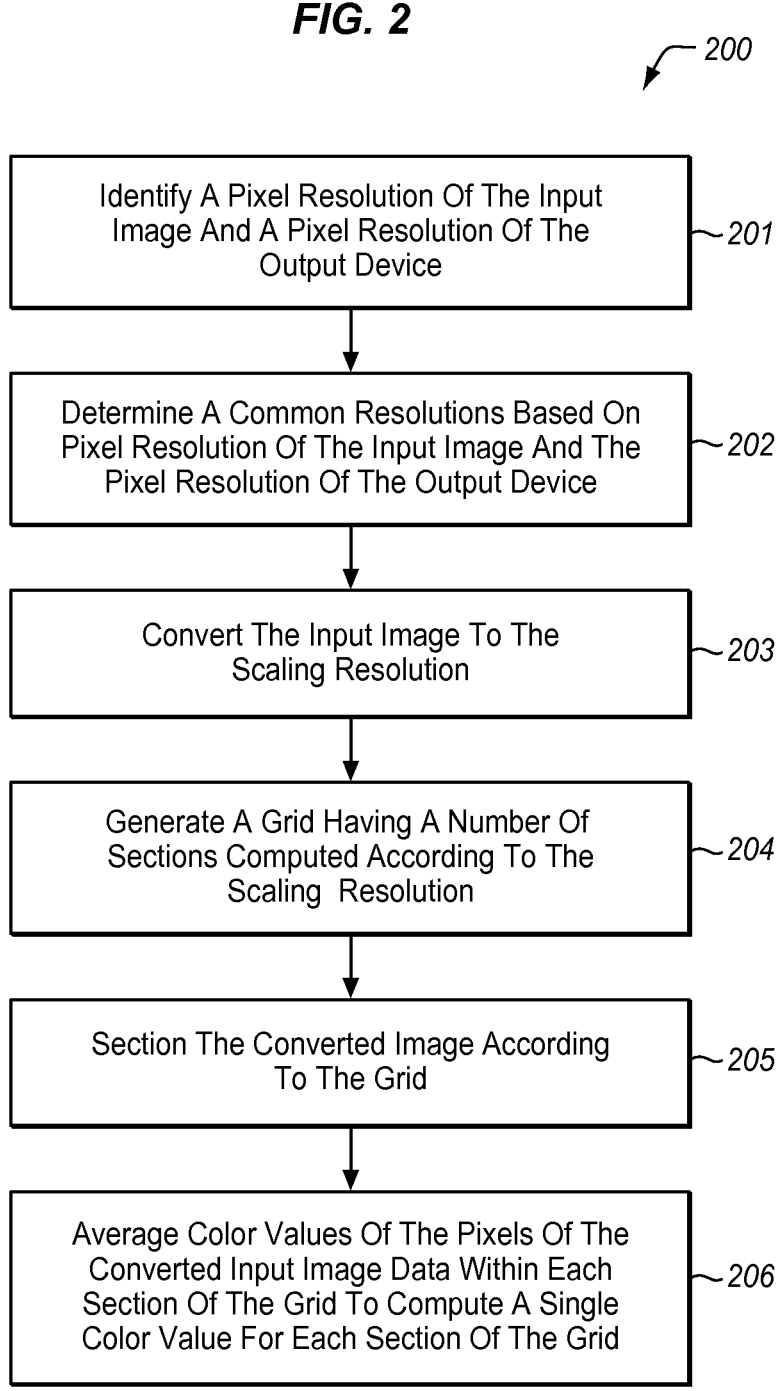
FIG. 2 is a flow chart illustrating a method of scaling an image in an exemplary embodiment.

FIG. 2 is a flow chart 200 illustrating a method of scaling an image in one exemplary embodiment. In this embodiment, the image scaling system 140 receives the image 120 having a particular number of pixels (e.g., dpi) and scales the image 120 according to a number of pixels of the desired output device 170. The ratio of the number of pixels of the input image 120 to the number of pixels of the output device 170 generally results in a non-integer scaling factor to which the image scaling system 140 accordingly scales the image. In doing so, the image scaling system 140 first identifies the pixel resolution of the input image 120 and a pixel resolution of the output device 170, in the process element 201. From there, the image scaling system 140 determines a ratio of the two pixel resolutions (e.g., the number of pixels of the input image 120 and the number of pixels of the output device 170), in the process element 202, to determine the scaling ratio. For the purposes of illustration, the discussion is focused on converting a 240 dpi image to a 360 dpi output, although virtually any scaling ratio may be performed. Moreover, the scaling may be performed in either direction (i.e., from a higher resolution to a lower resolution or vice versa). In this example, when a 240 dpi image is received by the image scaling system 140 and the desired output device 170 presents the image in a 360 dpi format, the ratio of 360 dpi to 240 dpi results in a non integer scaling factor of 1.5. The image scaling system 140 determines a resolution which is a multiple of both the 240 dpi image and the 360 dpi of the output device 170. In this case, 720 dpi is divided evenly by 240 dpi three times and by 360 dpi twice.

Figure 3:
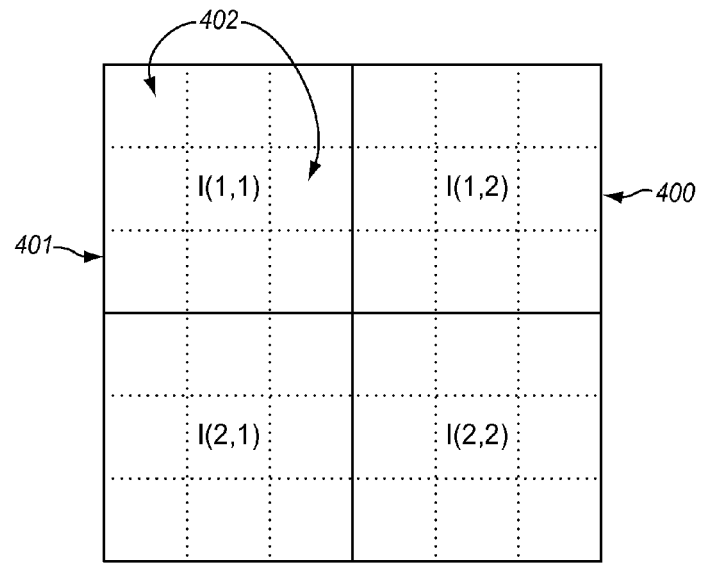
FIGS. 3-6 illustrate scaling of an image from one resolution to another using non integer scaling factors in an exemplary embodiment.

Based on this common scaling resolution, the image scaling system 140 converts the input image to the scaling resolution, in the process element 203, thereby increasing the number of pixels in the input image. For example, each pixel in the input image is increased to nine pixels due to a scaling factor of three in the horizontal and vertical directions, as illustrated in FIG. 3 (e.g., one pixel 401 of the 240 dpi format is represented by 3×3 pixels 402 in the 720 dpi format, each having the same color value).

Figure 4:
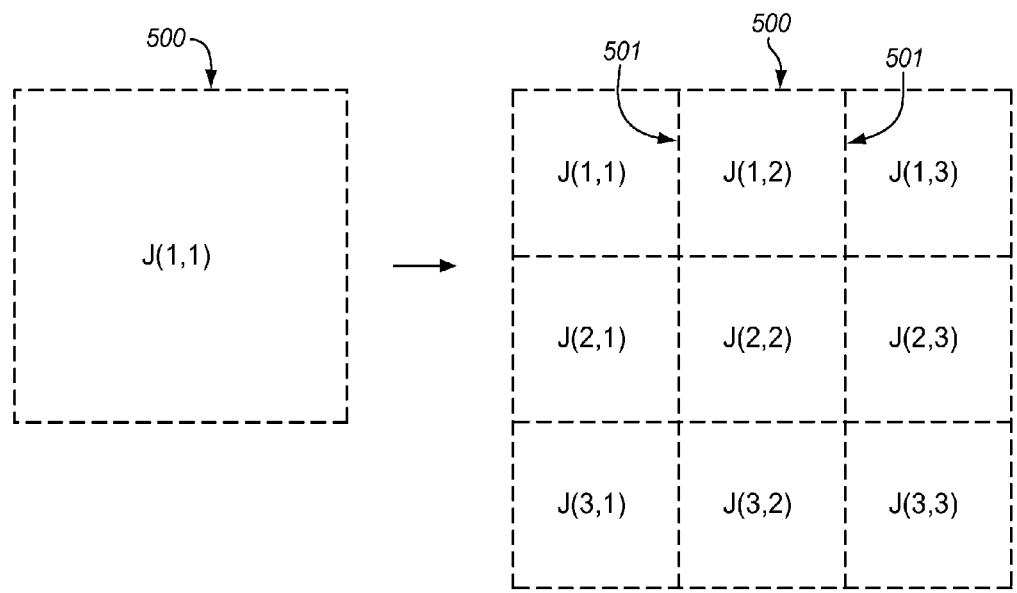
Figures 5, 6:
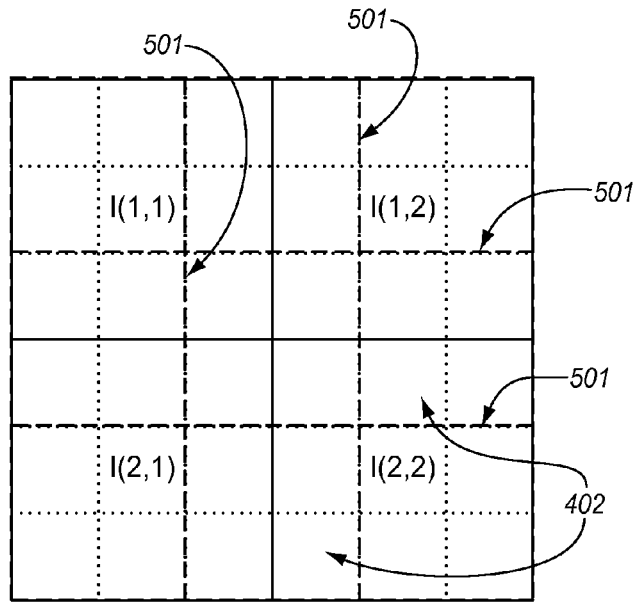

The image scaling system 140 also generates a grid 500 as shown in FIG. 4 based on the common resolution, in the process element 204. The grid 500 is configured by increasing the resolution of the 360 dpi format to the 720 dpi format, wherein each pixel of the grid 500 is represented by a placeholder color value J (e.g., at the locations (1,1), (1,2), (1,3) . . . (3,3)). For example, for a single grid pixel J(1,1) in the 360 dpi format, a total of four grid pixels would exist in the 720 dpi format due to a scaling factor of two in the horizontal and vertical directions, (e.g., one pixel J(1,1) of the 360 dpi format is represented by the four grid pixels J(1,1), J(1,2), J(2,1), and J(2,2) in the 720 dpi format). Because of the common scaling resolution, the grid lines 501 of the grid 500 lie on the lines that define the pixels 402, as shown in FIG. 5. For example, each of the grid pixels J(1,1), J(1,2), J(2,1), and J(2,2) of the 720 dpi format representing the J(1,1) grid pixel of the 360 dpi format lie on the same lines that define the pixels 402.

The grid 500 may then be used to compute pixel values for the scaled image based on the input image pixels 402. For example, the input image 400 illustrates four pixels in a 240 dpi format having various color values of I at pixel locations (1,1), (1,2), (2,1), and (2,2). When scaled to the 720 dpi format, each pixel location is represented by nine pixels 402 having the same color value. Based on the grid 500, the image scaling system 140 may section the converted input image 400 such that each section of the grid 500 includes an integer number of pixels 402 of the converted input image 400, in the process element 205 (i.e., in this instance, 4 pixels of the converted image). Afterwards, the image scaling system 140 may compute color values in the grid 500 by averaging the color values of the pixels 402 falling within each section of the grid 500, in the process element 206. In this regard, the J color values (1,1), (1,2), (1,3) . . . (3,3) may be computed as a function of the I color values at the pixel locations (1,1), (1,2), (2,1), and (2,2) according to how they overlap those pixel locations. Such is shown to the immediate right of the final scaled 360 dpi image 600 of FIG. 6.

The model for this image scaling algorithm can be mathematically written as follows:

$$\int_{A_1 \to 0} r_2(x_0, y_0, x, y) \quad \text{Equation 1}$$

$$dA_1(x, y) @ \int_{A_2 \to 0} r_2(x_0, y_0, x, y) dA_2(x, y).$$

where $x_0$ and $y_0$ are coordinate locations for the input image and the desired scaled image, respectively, x and y are spatial local variables, $A_1$ is a local area in the input image, $A_2$ is a local area in the desired scaled image, $r_1$ is a reflectance function for the input image, and $r_2$ is a reflectance function for desired scaled image. Equation 1 can be approximated as the following discrete function for digital processing as follows:

$$\sum_{A_1} r_1(x_0, y_0, x, y) \Delta A_1(x, y) \approx \sum_{A_2} r_2(x_0, y_0, x, y) \Delta A_2(x, y). \quad \text{Equation 2}$$

Factoring of the common terms and assuming a reflectance constant over a subdivided area (i.e., the common resolution), yields the following equation:

$$\sum_{A_1} r_1(x_0, y_0, x, y) \Delta A_1(x, y) \approx \sum_{A_2} r_2(x_0, y_0, x, y) \Delta A_2(x, y). \quad \text{Equation 3}$$

Figure 7:
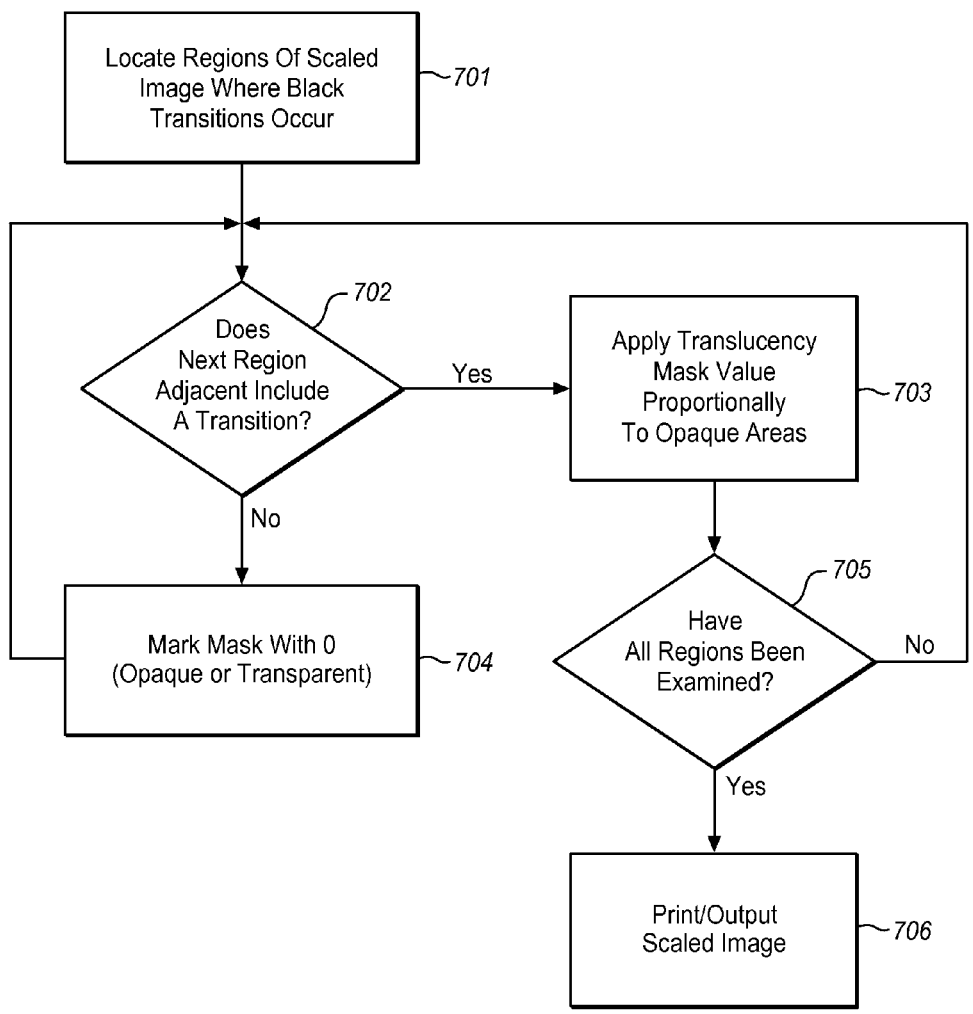
FIG. 7 is a flowchart illustrating an application of a translucency mask in an exemplary embodiment.
Figure 8:
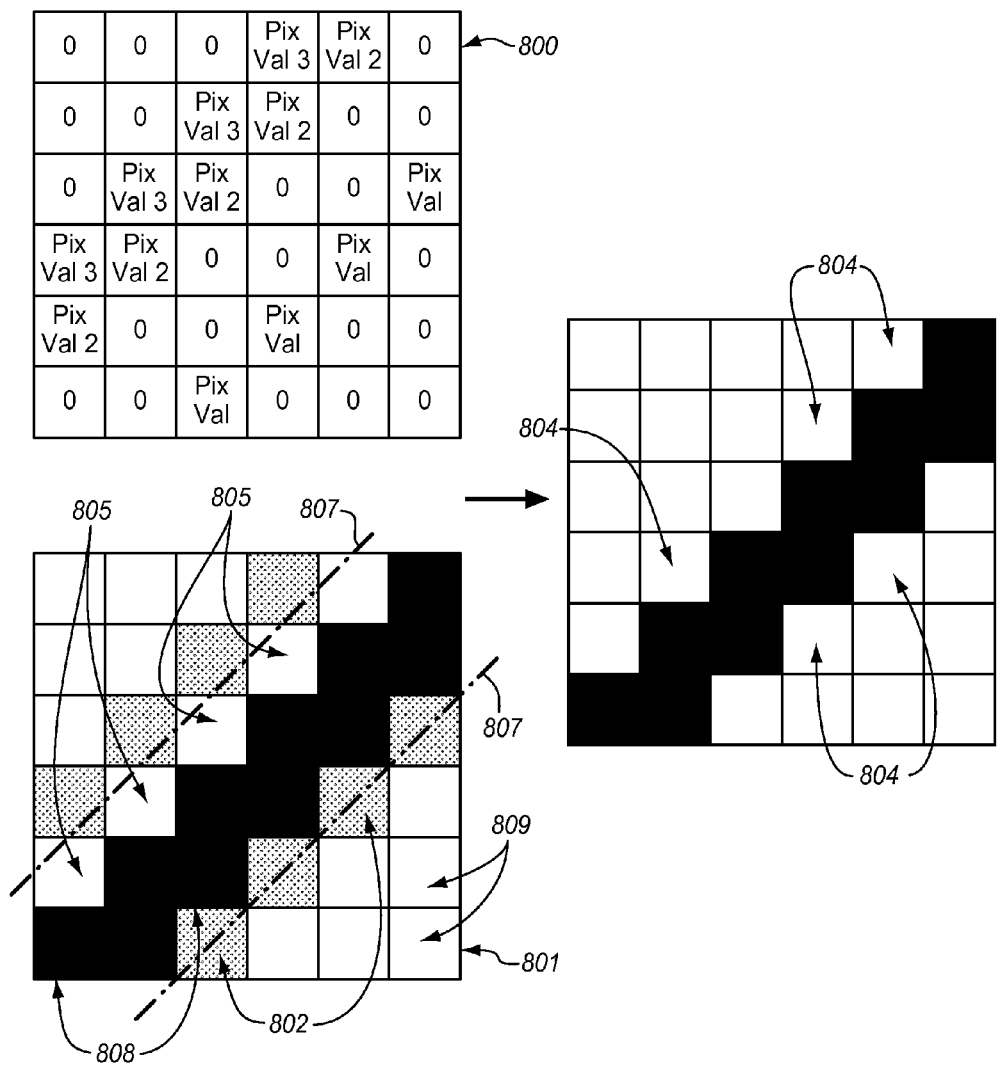
FIG. 8 is a pixel diagram illustrating the application of the translucency mask in an exemplary embodiment.

In image regions where there are transitions from opaque to transparent color values, the output of the scaling algorithm may yield an intermediate grayscale value in the range 1-254. In these regions, the background of the printed image should show through to improve the transition from the foreground color value to the background color value. In this regard, the image scaling system 140 may generate and apply a translucency mask to an image to remove the halo effect and blend the color transitions. FIGS. 7 and 8 illustrate creation of a translucency mask 800 in an exemplary embodiment. To generate the translucency mask 800, the image scaling system 140 may locate regions 802, 805, and 806 where opaque to transparent and transparent to opaque transitions 807 occur in an image 801 before scaling, in the process element 701. Once located, the image scaling system 140 may determine that the output regions 802, 805, and 806 occupied by the color transition are translucent regions, in the process element 702. If the regions 808 and 809 do not include a transition, the corresponding regions in translucency mask 800 may be set to zero. In this regard, the image scaling system 140 may configure the translucency mask 800 to contain mostly 0 values corresponding to regions where the scaled image is either completely opaque 808 or completely transparent 809, in the process element 704, and then return to the process element 702.

The translucency weight, represented by various pixel values in the transparency mask 800, is calculated by the portions of the translucent regions 802, 805, and 806 which are occupied by the opaque pixels in the input image. In one embodiment, the translucency weight is 128 representing roughly the middle of the 0 to 255 grayscale. In places where the translucency mask 800 is nonzero, the following generalized equation may be performed to obtain the translucency mask 800 pixel value:

Pixel Value=(area occupied by transparent area in a region)/(total area occupied by the region)*255.  Equation 4.

For example, in region 802, the pixel value would be 128. The pixel value 2 from regions 805 would be a lower (more opaque) value, and the pixel value 3 from regions 806 would be a higher (more transparent)

If, on the other hand, the region 802, 805, and 806 includes a transition, the image scaling system 140 may use the translucency mask 800 to smooth color transitions. For example, the image scaling system 140 may apply a translucency mask value proportionally to opaque areas, in the process element 703. This is performed using the pixel value in the corresponding translucency mask 800:

Output Value=(color value of background pixels 809)
\*(Pixel Value/255)+(255−Pixel Value)/255\*
(color value of opaque pixels 808).   Equation 5.

The image scaling system 140 then determines whether all regions have been examined, in the process element 705. If so, the image scaling system 140 prepares the image for output/printing, in the process element 706. Otherwise, the image scaling system 140 continues processing the image data by returning to the process element 702. Blurring by the Human Vision System (HVS) may assist in the accurate representation of the image when displayed. Typically, a transparency mask is used with a translucency mask to determine whether pixels set to 0 in the translucency mask 800 are transparent 809 or opaque 808. This determines the non-translucent color values of the final image 801.

Additionally, the translucency mask 800 may be stored for application to another image. For example, the translucency mask values that were used to adjust a series of previous images may be saved and applied to another background of pixels. Such may be performed according to the following.

$$Xn=(1-M1)*X1+M1*X0,\qquad \text{Equation 6.}$$

where M is a translucency range from 0 (opaque) to 1 (totally translucent), X is an opacity range from 0 (all white) to 255 (all black), Xn is a new value derived from the translucency mask M1 of a new image's translucency, and X1 is the color value of the new image's color using X0 as an existing bitmap color value. To save the translucency in the mask M1, the following equation is used $$Mn=M1*M0,\qquad \text{Equation 7.}$$

where Mn is a new value derived from a new translucency mask M1 and M0 is the existing translucency mask value. M0 is generally initialized to 1 for a stored image whereas X0 is initialized to 0. To add a stored image with its associated translucency mask to an existing bitmap for printing, the following formula is used:

$$Xnc=Xc+Mc*X0\qquad \text{Equation 8.}$$

where Xnc is a new bitmap value, Xc is a value in the added stored bitmap, and Mc is the translucency mask value of the added stored bitmap for a particular pixel. Since M is generally in units of 1-255 for grayscale, the range for M values yields the following equations:

$$Xn=(255-M1)*X1/255+M1*X0/255$$

$$Mn=M1*M0/255$$

$$Xnc=Xc+Mc*X0/255.\qquad \text{Equations 9-11.}$$

An extension of this scaling to the anamorphic case also can be accomplished using the scaling factors for two different uniform scalings. For example, the factors can be computed for each scaling ratio, vertical and horizontal. The factors for the first rows of each instance may be used to compute the anamorphic factors for each of the different scan lines in the image (e.g., in the vertical direction). Instead of interpreting the factors applied to individual pixels, the factors are applied to all of the pixels in an image.

Alternatively or additionally, the scaling algorithm may operate once in the horizontal direction to determine the mapping of input pixels to the output pixels for each row. The horizontal scaling may be performed in the same manner for each row (i.e., the horizontal indices of the pixels of the input image generally do not change from row to row). The scaling algorithm may also perform a vertical scaling once to determine a mapping of input scanlines to output scanlines. The vertical calculations may also be performed for a single column in the image. The final result of these computations is a list of contributing input scanline indices for each output scanline and a list of contributing input pixel indices for each output pixel along with weights for each.

Based on the scaling factor and the computed weights, the scaling algorithm may be optimized to decrease the number of multiplications in the output image. For example, if a common scale factor results most often in 4 input pixel locations contributing to an output pixel value (e.g., assuming a 240 dpi to 360 dpi scaling), the image scaling system 140 may configure a "lookup table" for the 16 possible combinations of 4 input pixel values such that a value for the output pixel is selected as opposed to being computed. Further optimizations may include a using a lookup table that includes values for the most common combinations of the 4 input pixels (e.g., all white values, all black values, etc.)

Additionally, a transparency mask may be used after the image is scaled and the translucency mask is applied. For example, the transparency mask may convey information about image regions that are either completely opaque or completely transparent. In this regard, the image scaling system 140 may merge the scaled image directly into the final bitmap. Some portions of the image may be transparent (e.g., a bi-level IOCA input is assumed to have a transparent background). The image scaling system 140 may account for such by applying the transparency mask to the final bitmap. Transparency masks are known to those skilled in the art.

Figure 9:
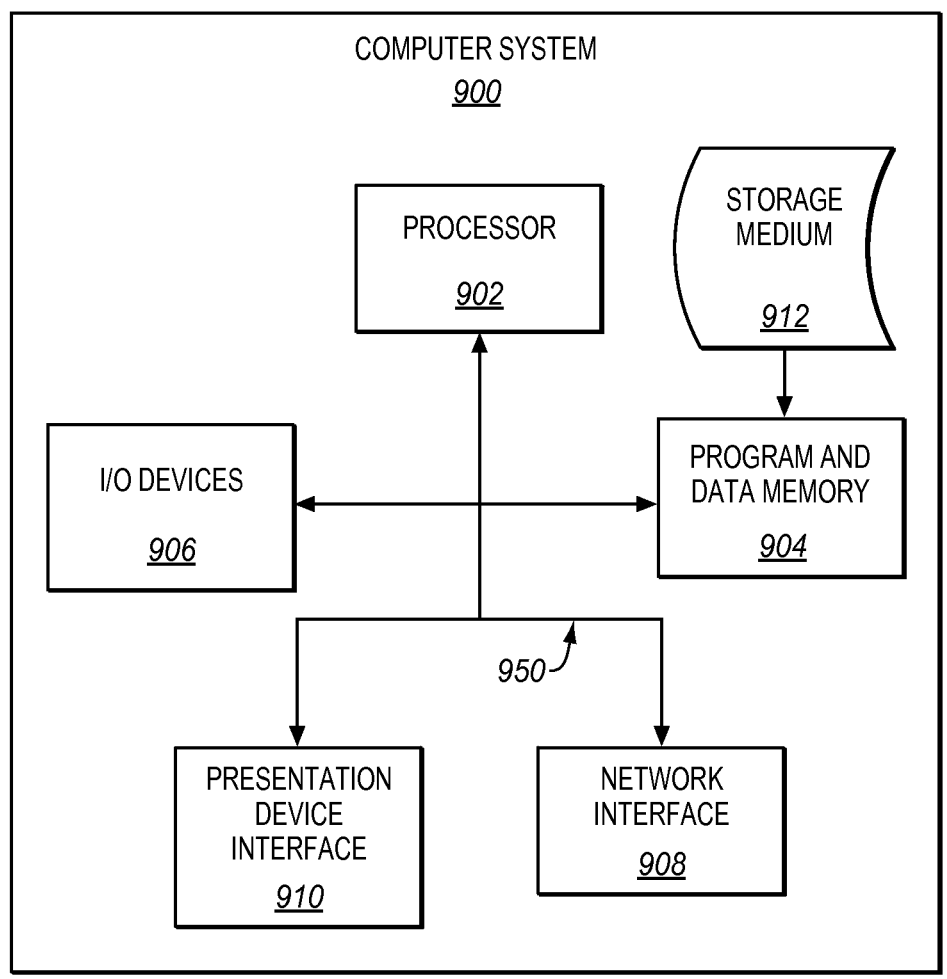
FIG. 9 illustrates a computer system operable to execute computer readable medium embodying programmed instructions to perform desired functions in an exemplary embodiment.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc. FIG. 9 is a block diagram depicting a computer system 900 operable to provide features and aspects hereof by executing programmed instructions and accessing data stored on a computer readable storage medium 912.

Furthermore, embodiments of the invention can take the form of a computer program accessible via a computer-readable medium 912 providing program code for use by a computer or any other instruction execution system. For the purposes of this description, a computer readable medium 912 can be anything that can contain, store, communicate, or transport the program for use by the computer other instruction execution system.

The computer readable medium 912 can be an electronic, magnetic, optical, electromagnetic, infrared, or semiconductor device. Examples of the computer readable medium 912 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The computer system 900, being suitable for storing and/or executing the program code, includes at least one processor 902 coupled to memory elements 904 through a system bus 950. The memory elements 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc) can be coupled to the system either directly or through intervening I/O controllers. Network adapter interfaces 908 may also be coupled to the system to enable the computer system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 910 may be coupled to the system to interface to one or more presentation devices, such as printing systems and displays for presentation of presentation data generated by processor 902.

Figure 10:
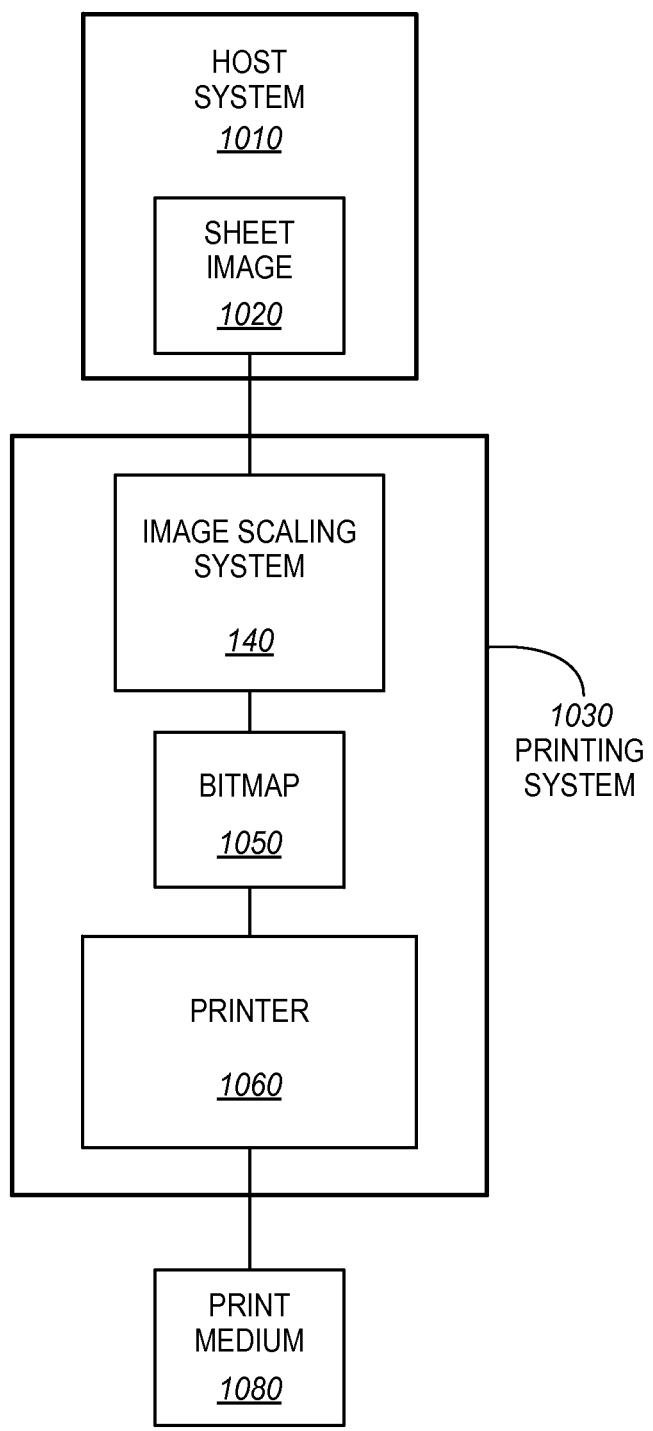
FIG. 10 is a block diagram illustrating a printing system implementing non integer scaling factors in an exemplary embodiment.

FIG. 10 is a block diagram illustrating a printing system 1030 using non integer scaling factors in an exemplary embodiment. A host system 1010 is in communication with the printing system 1030 to print a sheet image 1020 onto a print medium 1080 via a printer 1060. The resulting print medium 1080 may be printed in color and/or in any of a number of gray shades. The host system 1010 may comprise any computing device, such as a personal computer or a server. The sheet image 1020 may be any file or data that describes how an image on a sheet of print medium should be printed. For example, the sheet image 1020 may include PostScript data, Printer Command Language ("PCL") data, the Intelligent Printer Data Stream ("IPDS") data, and/or any other printer language data. The printing system 1030 may be a high-speed printer operable to print relatively high volumes (e.g., greater than 100 pages per minute). The print medium 1080 may be continuous form paper, cut sheet paper, and/or any other medium suitable for printing. The printing system 1030, in one generalized form, includes the printer 1060 that presents a bitmap 1050 onto the print medium 1080 (e.g., via toner, ink, etc.) based on the sheet image 1020.

The image scaling system 140 may be any system, device, software, circuitry and/or other suitable component configured within the printing system 1030 that is operable to transform the sheet image 1020 and generate a scaled bitmap 1050 for printing onto the print medium 1080 in accordance with the non integer scaling described above. The image scaling system 140 may be configured as part of a print controller of the printing system 1030 and/or any other portion of the printing system 1030. In another embodiment, the image scaling system 140 may be configured with the host system 1010.

Although specific embodiments were described herein, the scope of the invention is not limited to those specific embodiments. For example, the scaling algorithms are often described herein with respect to printing systems. However, the scaling algorithms may be employed in virtually any device which is used to display images. Examples of such include computer monitors, televisions, digital cameras, and the like. To illustrate, an image may be captured using a digital camera. A user may desire to display the image on a computer monitor that requires non integer scaling of the image, accomplished via scaling algorithms presented herein. Additionally, although shown and described with respect to non integer scaling factors, the invention is not intended to be so limited. The scaling algorithms presented herein may be used to scale images via virtually any scaling factor. For example, the previous embodiments show and describe a scaling ratio of 1.5 that provides a relatively easy scaling resolution that is evenly divisible by both the input and output pixel resolutions. However, the systems and methods presented herein may also be used for scaling ratios that do not provide such common scaling resolutions. Moreover, the systems and methods presented herein may be used to scale image data from a lower resolution to a higher resolution and vice versa. Accordingly, the scope of the invention is only defined by the following claims and any equivalents thereof.

We claim:

1. A method of scaling an input image, the method comprising:
identifying a pixel resolution of the input image;
identifying a pixel resolution of an output device;
determining a scaling resolution based on the pixel resolution of the input image and the pixel resolution of the output device, wherein the pixel resolution of the input image is a first factor of the scaling resolution, the pixel resolution of the output device is a second factor of the scaling resolution, and the first and second factors are different;
converting the input image to the scaling resolution to change a number of pixels of the input image by the first factor of the scaling resolution;
generating a grid to scale the converted image, wherein the grid has a number of sections defined according to the second factor times the pixel resolution of an output device;
sectioning the converted input image according to the grid, wherein each section of the grid includes an fractional number of pixels of the converted input image;
averaging color values of the pixels of the converted input image within each section of the grid to compute a single color value for each section of the grid and scale the input image; and
generating a translucency mask and applying the translucency mask to the scaled image to blend color values with background color values.

2. The method of claim 1, wherein the color values of opaque pixels of the input image are single grayscale value.

3. The method of claim 1, further comprising storing at least a portion of the translucency mask and the scaled image for application to a subsequently received input image to optimize processing of the subsequently received input image.

4. The method of claim 1, wherein the scaled image comprises an anamorphic format.

5. An image scaling system, comprising:
an interface operable to receive an image and output a scaled image;
a processor communicatively coupled to the interface,
wherein the processor is operable to identify a pixel resolution of the received image, identify an output pixel resolution, and determine a scaling resolution based on the pixel resolution of the received image and the output pixel resolution, wherein the pixel resolution of the received image is a first factor of the scaling resolution, the output pixel resolution is a second factor of the scaling resolution, the first and second factors are different, and a ratio of the output pixel resolution to the pixel resolution of the received image comprises a non integer scaling factor,
wherein the processor is further operable to convert the received image to the scaling resolution to change a number of pixels of the received image by the first factor of the scaling resolution, generate a grid to scale the converted image, wherein the grid has a number of sections defined according to the second factor times the output pixel resolution, wherein the processor is further operable to section the converted received image according to the grid, wherein each section of the grid includes a fractional number of pixels of the converted received image,
wherein the processor is further operable to average color values of the pixels of the converted received image within each section of the grid to compute a single color value for each section of the grid and scale the received image, and wherein the processor is further operable to generate a translucency mask and apply the translucency mask to the scaled image to smooth foreground color values from background color values.

6. The image scaling system of claim 5, wherein the color values of the pixels of the received image are grayscale values.

7. The image scaling system of claim 5, wherein the processor is further operable to store at least a portion of the translucency mask and the scaled image for application to a subsequently received image to optimize processing of the subsequently received image.

8. The image scaling system of claim 5, wherein the scaled image comprises an anamorphic format.

9. The system of claim 5, further comprising a printer operable to print the scaled image to a print medium, wherein the output pixel resolution is a pixel resolution of the printer and the processor is further operable to transfer the scaled image to the printer for printing to the print medium.

10. A software program stored on one or more non transitory computer readable mediums, wherein the software program comprises instructions that, when executed on a processor, are operable to direct the processor to scale an input image, the instructions operable to direct the processor to:

identify a pixel resolution of the input image;
identify a pixel resolution of an output device;
determine a scaling resolution based on the pixel resolution of the input image and the pixel resolution of the output device, wherein the pixel resolution of the input image is a first factor of the scaling resolution, the pixel resolution of the output device is a second factor of the scaling resolution, and the first and second factors are different;

convert the input image to the scaling resolution to increase a number of pixels of the input image by the first factor of the scaling resolution;

generate a grid to scale the converted image, wherein the grid has a number of sections defined according to the second factor times the pixel resolution of an output device;

section the converted input image according to the grid, wherein each section of the grid includes a fractional number of pixels of the converted input image;

average color values of the pixels of the converted input image within each section of the grid to compute a single color value for each section of the grid and scale the input image, and generate a translucency mask and apply the translucency mask to the scaled image to smooth foreground color values from background color values.

11. The software program of claim 10, wherein the color values of the pixels of the input image are grayscale values.

12. The software program of claim 10, wherein the instructions are further operable to direct the processor to store at least a portion of the translucency mask and the scaled image for application to a subsequently received input image to optimize processing of the subsequently received input image.

13. The software program of claim 10, wherein the scaled image comprises an anamorphic format.

* * * * *